United States Patent [19]

Nakagawa et al.

[11] Patent Number: 4,672,082
[45] Date of Patent: Jun. 9, 1987

[54] FRICTION MATERIAL USING STEEL FIBERS

[75] Inventors: Mitsuhiko Nakagawa; Fumiaki Nitto, both of Itami, Japan

[73] Assignee: Sumitomo Electric Industries, Ltd., Osaka, Japan

[21] Appl. No.: 795,875

[22] Filed: Nov. 7, 1985

[30] Foreign Application Priority Data

Nov. 12, 1984 [JP] Japan ................................ 59-238197

[51] Int. Cl.[4] ............................ C08K 3/08; C08J 5/14
[52] U.S. Cl. .................................... 523/153; 523/149; 523/150; 523/152; 523/155; 523/156; 523/157; 523/158
[58] Field of Search ............... 523/149, 150, 152, 153, 523/155, 156, 157, 158, 159

[56] References Cited

U.S. PATENT DOCUMENTS

| 4,273,699 | 6/1981 | Chester | 523/153 |
| 4,278,584 | 7/1981 | Noguchi et al. | 523/155 |

FOREIGN PATENT DOCUMENTS

| 59-24774 | 2/1984 | Japan | 523/149 |
| 59-133841 | 3/1984 | Japan | 523/155 |

Primary Examiner—Lewis T. Jacobs
Attorney, Agent, or Firm—Cushman, Darby & Cushman

[57] ABSTRACT

A friction material particularly useful for vehicle brakes comprises a friction material body including a plurality of steel fibers. Each steel fiber includes at least 0.07% by weight of sulphur, at least 0.10% by weight of phosphorus, or at least 0.15% by weight of both sulphur and phosphorus. The friction material exhibits high friction coefficients and less abrasion with respect to materials against which it bears as compared to conventional wear materials utilizing steel fibers.

6 Claims, No Drawings

FRICTION MATERIAL USING STEEL FIBERS

FIELD OF INVENTION

The present invention relates to a friction material for use in vehicle brakes, clutches, etc., such as those typically utilized in trucks and automobiles and, particularly, to a friction material using steel fibers suited for use as a disc or drum brake of a vehicle brake assembly.

BACKGROUND AND SUMMARY OF INVENTION

In general, friction materials for brakes are typically produced by combining together asbestos as a strength material, ceramic (inorganic) powders such as oxides and carbides as a friction coefficient (hereafter referred to as "$\mu$")-increasing material, and graphite, soft metal, etc. as a friction-controlling material by the use of an organic binder (resin). Asbestos, however, has well known safety and hygienic disadvantages in the production or use thereof. Accordingly, it has been proposed to make friction materials for vehicle brakes asbestos-free by using steel fibers as the strength material in place of asbestos (see for example, Japanese Patent Application (CPI) Nos. 157673/80 and 111373/82 which disclose friction materials using iron powder and steel fibers in place of asbestos). Thus, the use of steel fibers in friction materials is, in and of itself, known.

It is necessary for the friction material however to exhibit a high friction coefficient ($\mu$). Accordingly, for those friction materials using conventional steel fibers, various techniques are known to increase the friction material's friction coefficient. For example, the friction coefficient is increased by increasing the carbon content of the steel fibers so as to also increase the hardness of the resulting friction material. Additionally, the diameter of the steel fibers can be increased to thereby increase the friction coefficient as a result of its increased abrasive surface area with respect to the bearing surface of the brake drum, rotor or the like. Such a technique leads to a problem that the material of the brake drum etc. is seriously worn.

A friction material using steel fibers has thus been needed which has a high friction coefficient while yet decreases the wear amount of the material of the brake drum, rotor and the like against which the friction material bears.

In general, P (phosphorus) and S (sulfur) are impurities for steel, and are responsible for a reduction in its strength, toughness, workability, and so forth. Thus, it has been conventional wisdom in the production of steel, to decrease the phosphorus and sulfur contents as much as possible and such has been the case for steel fibers to be used in brake friction materials. In all conventional steel fibers, both the P and S contents are typically not more than 0.04% while the fiber's carbon content is between 0.1 to 0.2%.

It has been discovered, according to the present invention, that larger amounts of P and S in the steel fibers than have been conventionally utilized surprisingly increase the friction coefficient ($\mu$) while at the same time, decrease the wear of the brake drum or rotor material. That is, as the P and S contents increase, the friction coefficient ($\mu$) is also increased and the material against which the friction material bears is less worn as compared to conventional friction materials for similar purposes.

The present invention thus overcomes the above defects of the conventional friction materials using conventional steel fibers and provides a friction material having a high friction coefficient and less abrasion of the material against which the friction material bears by using steel fibers containing at least 0.07% of phosphorus, at least 0.10% of sulfur, or at least 0.15% of both phosphorus and sulfur.

DETAILED DESCRIPTION OF THE PREFERRED EMBODIMENTS

A further understanding of this invention will be obtained by reference to the following nonlimiting example.

EXAMPLE

A friction material was prepared by combining the following materials and forming the combined materials into a friction pad for an automobile disc brake:

| | |
|---|---|
| Steel Fibers | 45 wt. % |
| Phenol Resin | 8 wt. % |
| BaSO$_4$ | 10 wt. % |
| Graphite | 14 wt. % |
| SiO$_2$ | 1 wt. % |
| Sb$_2$O$_3$ | 8 wt. % |
| Kevlar ® Pulp* (Aramide Fibers) | 7 wt. % |
| Cu Powder | 7 wt. % |
| | 100 wt. % |

*Kevlar ® is a Registered Trademark of E. I. DuPont deNemours & Co., Wilmington, Delaware.

The friction pad was formed by pressing the above mixture at ambient temperature under a pressure of 350 kg/cm$^2$ for one minute using a press. The pad was then molded in the press at 150° C. under a pressure of 300 kg/cm$^2$ for 10 minutes and then after-cured in a furnace at a temperature of 250° C. for 15 hours. The friction pad thus obtained was ground to a desired thickness and then bonded to a metallic back plate to thereby produce a pad assembly.

Steel fibers A-F having sulphur, phosphorus and carbon as constituents were utilized in the friction materials of this example as identified below in materials of this example as identified below in Table 1.

TABLE 1

| Fiber No. | Components of Steel Fibers | | |
|---|---|---|---|
| | S (wt. %) | P (wt. %) | C (wt. %) |
| A | 0.005 | 0.015 | 0.15 |
| B | 0.015 | 0.057 | 0.16 |
| C | 0.075 | 0.061 | 0.15 |
| D | 0.035 | 0.105 | 0.16 |
| E | 0.061 | 0.092 | 0.16 |
| F | 0.180 | 0.111 | 0.09 |

The pad assemblies having the friction materials respectively containing steel fibers A-F were tested by means of a dynamometer to simulate a 1500 cc powered automobile.

The following tests were performed.

(a) Burnish: Each brake pad was applied 200 times at a deceleration rate of 0.3 g* from 65 km/hr to stop with the pad temperature before braking being 120° C.

*The unit "g" herein denotes the acceleration of gravity—that is, approximately 9.8 meter/sec$^2$.

(b) Effectiveness Test: Each brake pad was tested five times at a deceleration rates of 0.6 g from 50 km/hr, 100 km/hr and 130 km/hr to stop, respectively. The pad temperature before each braking cycle was 100° C. and the friction coefficient for the pads was measured after each braking cycle.

(c) Disc Rotor Abrasion Test: Each brake pad was applied 4000 times at a deceleration rate of 0.05 g from 50 km/hr to stop in order to measure the abrasiveness of the wear material of this invention upon a conventional cast iron brake disc rotor. The pad temperature before braking was 50° C. and the amount of the cast iron rotor which was abraded during braking was measured.

The results of the above tests are shown in table 2 below.

TABLE 2
(Test Results)

| Sample | Friction Coefficient | | | Amount of Disc Rotor Material Worn Out ($\times 10^{-3}$ m/m) |
|---|---|---|---|---|
| | 50 km/H | 100 km/H | 130 km/H | |
| A* | 0.33 | 0.35 | 0.32 | 39 |
| B* | 0.35 | 0.34 | 0.33 | 35 |
| C** | 0.39 | 0.38 | 0.36 | 29 |
| D** | 0.41 | 0.39 | 0.36 | 32 |
| E** | 0.43 | 0.40 | 0.37 | 24 |
| F** | 0.45 | 0.43 | 0.39 | 31 |

*Comparative Conventional Product
**Product of Present Invention

It can be seen from the above results that the products of the present invention have a high friction coefficient and less abrasion and attack on the disc rotor material as compared with the conventional products using steel fibers having low sulphur and phosphorus contents, and thus have excellent characteristics as friction materials.

As described above in detail, the present invention uses steel fibers having high sulphur and phosphorus contents which have not been been thought of as being really useful for friction materials for vehicles using steel fibers. Thus the present invention is very effective in that it provides a friction material which is low cost, has a high friction coefficient, and less abrasion with respect to other materials.

What we claim is:

1. A friction material comprising steel fibers in a friction material body, wherein said steel fiber consists essentially of at least 0.07% by weight sulfur, at least 0.10% by weight phosphorus or at least 0.15% of both sulfur and phosphorus, and wherein said friction material body consists of, in approximate percents by weight of said body:
   Steel Fibers: 45%
   Phenol Resin: 8%
   BaSO$_4$: 10%
   Graphite: 14%
   SiO$_2$: 1%
   Sb$_2$O$_3$: 8%
   Aramide Fibers: 7%
   Cu powder: 7%.

2. A friction material for use in braking elements comprising phenolic resin and steel fibers, wherein said steel fibers contain, by weight, at least 0.07% phosphorus, at least 0.10% sulfur, or at least 0.15% of both phosphorus and sulfur.

3. A friction material as claimed in claim 2, wherein said friction material is about 45% by weight steel fibers.

4. A friction material as claimed in claim 2, wherein said steel further comprises, by weight, 0.09% to 0.15% carbon.

5. A friction material as claimed in claim 2, wherein said friction material is about 8% by weight phenolic resin.

6. A friction material as claimed in claim 2 further comprising BaSO$_4$, graphite, SiO$_2$, Sb$_2$O$_3$, aramide fibers, and copper powder.

* * * * *